April 12, 1949.   G. H. GARRAWAY   2,466,888
FLOATING SPACER BEARING LINK
FOR PARALLEL SHAFTS
Filed Oct. 3, 1945   2 Sheets-Sheet 1

INVENTOR
George H. Garraway
by his attorneys
Stebbins, Blenko & Webb

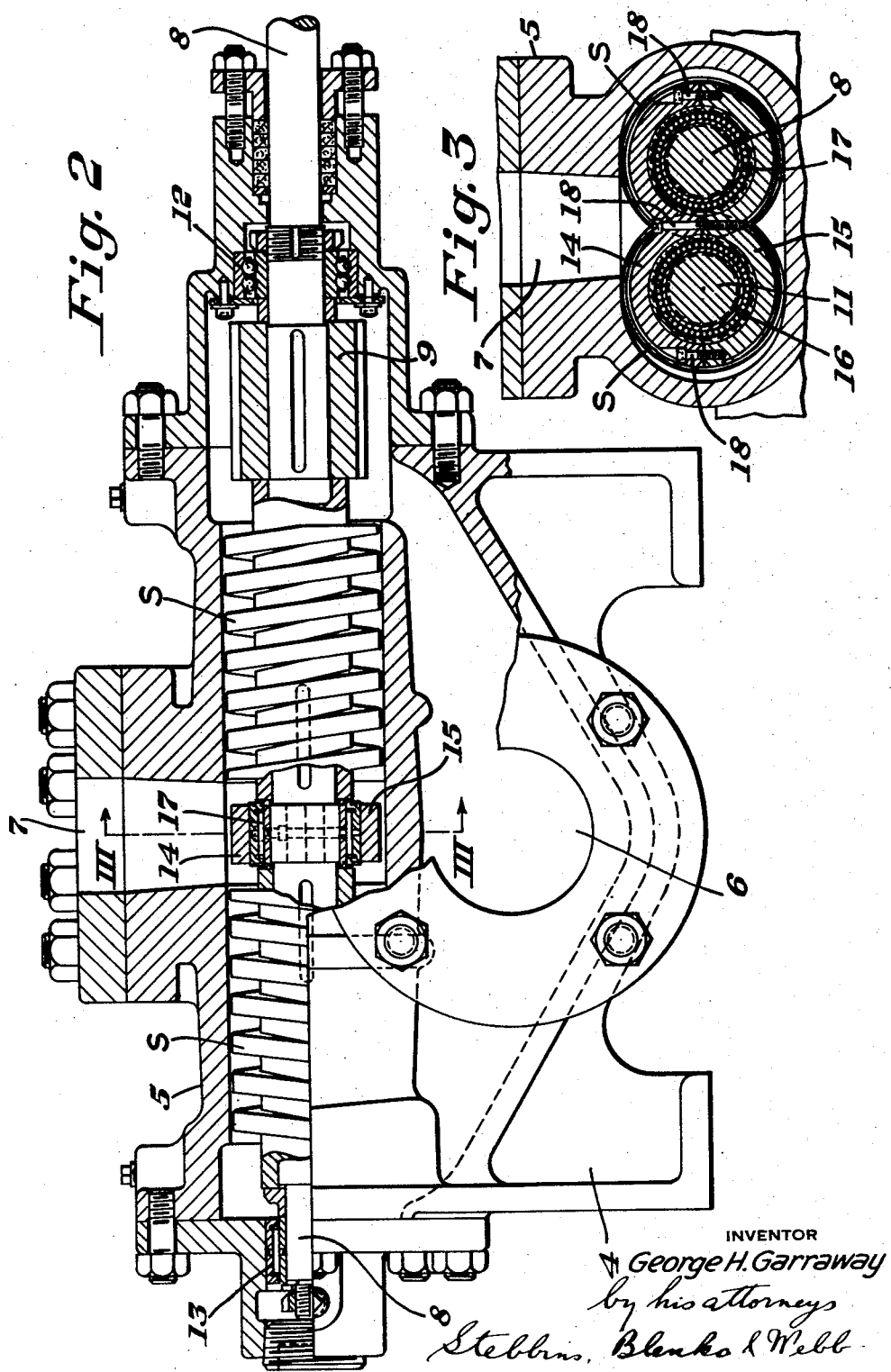

Patented Apr. 12, 1949

2,466,888

UNITED STATES PATENT OFFICE 2,466,888

FLOATING SPACER BEARING LINK FOR PARALLEL SHAFTS

George H. Garraway, Westfield, N. J., assignor to H. K. Porter Company, Inc., Pittsburgh, Pa., a corporation of Pennsylvania Application October 3, 1945, Serial No. 619,951

5 Claims. (Cl. 103—128)

My invention relates to bearings for use in conjunction with parallel shafts, and while it is herein described as employed in the form of a floating bearing for maintaining the parallel shafts of a screw pump in their proper relative positions, the invention is capable of use also in connection with parallel shafts of various other types of mechanisms.

In screw pumps of the type employing a pair of parallel shafts having mating or meshing screws, it is common practice to provide bearings at the ends of each shaft and also an intermediate bearing for each shaft, the intermediate bearings being formed in the casing or body of the pump. This arrangement is not entirely satisfactory, because of the difficulty of machining and maintaining three bearings in a perfectly straight line. If the central bearing is omitted, deflection of the shafts may occur under high pressure operation or in the pumping of liquids of widely different temperatures, particularly if the span between the two bearings is considerable.

One object of my invention is to provide a bearing structure for parallel shafts, of such form that the shafts will be maintained in accurately spaced relation under various mechanical stresses and temperature changes.

Another object of my invention is to provide a spacer or alining bearing of the type referred to which floats freely, i. e., is supported entirely by the shafts and has no direct connection to the casing.

Still another object of my invention is to provide a bearing of the character referred to which is of simple form and highly effective for its intended purpose.

In the accompanying drawings,

Figure 2 is a longitudinal sectional view through the structure on the plane of line II—II of Figure 1; and Figure 3 is a view taken on the line III—III of Figure 2.

Figure 1:
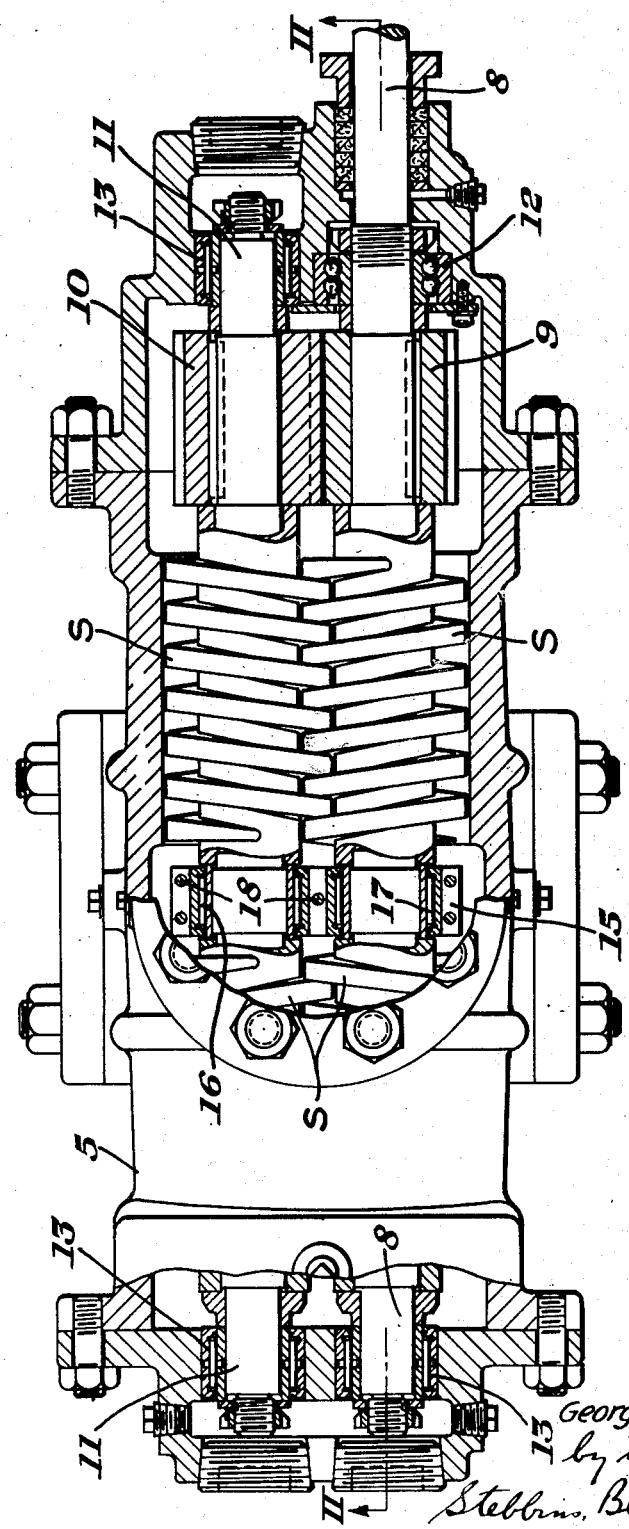
Figure 1 is a plan view, partly in section, of a screw pump equipped with my invention on the plane containing the screw axes.

The pump may, for the most part, be of conventional form, in that there is a base 4 upon which a pump casing 5 is carried, an inlet 6 and an outlet 7 being also provided. A screw shaft 8 is driven from any suitable source of power and, through gears 9 and 10, drives a screw shaft 11. Opposed screws S on the shafts are so arranged as to move a liquid from the inlet 6 to each end of the casing and thence to the discharge opening 7, as is well known in devices of this character. The shaft 8 has a ball bearing 12 at one end and a needle or roller bearing 13 at its other end, the ball bearing serving to resist endwise displacement of the shaft under the thrust of the pump screw. Shaft 11 is journaled in bearings 13 at both ends.

In order to prevent relative deflection or displacement of the shafts 8 and 11, I provide a bridging member or spacer link which may be of a single piece, but is here shown as split horizontally and including an upper member 14 and a lower member 15, each having a pair of semicircular recesses or bearing pockets forming spaced collars for receiving needle or roller bearings 16 and 17. The shafts 8 and 11 are journaled, respectively, in the bearings 16 and 17. The halves 14 of the link are fastened together by screws 18. The shaft 8 extends through the bearing 12, the bearing 17 and into the bearing 13, and the shaft 11 similarly extends through its bearings, including the bearing 16. The bearings 16 and 17 are confined between adjacent ends of the opposed screws S on shafts 8 and 11.

The shaft 8 is held at the driving end against axial movement by the ball bearing 12. The other end of the shaft can shift or slide axially in the bearing 13. This freedom of that portion of the drive shaft 8 that is located outwardly beyond the bearing 12 permits elongation of the shaft that might be caused by thermal expansion in the pumping of hot oil, for example, without stressing the bearings or casing.

It will be seen that the collar or spacer link 14, and its associated bearings have no direct connection with the pump casing. The link thus floats freely with the shafts but maintains them in accurately spaced relation at a point mid-way between their supporting bearings, notwithstanding variations in pumping forces and temperature changes. The screws are thus maintained in proper relation without scoring or deflection which would impair the close clearances therebetween and permit leakage.

This arrangement avoids the necessity of using extremely large shafts in order to prevent scoring of the screws or the cylinder walls, when the pump is used for pumping liquids at high pressures.

I claim:

1. The combination with a pump of the screw type, having a casing, spaced bearings in the casing, a pair of parallel shafts with screws thereon journaled in said bearings, of a floating bearing link within said casing and intermediate said bearings for maintaining the shafts in predetermined spaced relation, said link comprising a pair of collars having a fixed center-to-center distance surrounding the shafts and containing bearings therefore, said link further being supported solely on and by said shafts.

2. In a pump, a casing having an elongated chamber, an inlet opening at each end of the chamber and a discharge outlet at a midpoint, parallel shafts extending through the chamber having interfitting screws thereon so arranged that they will direct fluid from the inlet openings to the said outlet, bearings for supporting the ends of the shafts, and a spacer link within the chamber connecting the shafts at a point adjacent to the outlet and containing bearings for the shafts, said link being spaced apart at all points from the casing and all parts of the pump supported thereby within said chamber other than said shafts, so as to float freely on said shafts relative to the chamber and said parts other than said shafts.

3. In a screw pump or the like, having, a pump casing, parallel rotating shafts in said casing, said shafts being journaled at their ends with a fixed spaced distance between their axes, said shafts further being subject to pressures during operation tending to change said fixed spaced distance intermediate their ends, the improvement comprising, a closed link within said casing connecting said shafts intermediate their ends and adapted to maintain said fixed spaced distance at that point without change, said link being supported directly and solely on and by said shafts.

4. In a screw pump or the like, having, a pump casing, parallel rotating shafts in said casing, said shafts being journaled at spaced points to maintain a fixed spaced distance between their axes, said shafts further being subject to pressures during operation tending to change said fixed spaced distance particularly at points intermediate said spaced points, the improvement comprising, a link substantially in the form of, a figure-8 within said casing and connecting said shafts intermediate said spaced points, said link adapted to journal said shafts respectively in the loops of said figure-8 and to maintain said fixed spaced distance at said intermediate point without change, said link being supported directly and solely by said shafts.

5. In a screw pump or the like, having, a pump casing, parallel rotating shafts in said casing, said shafts being journaled at spaced points to maintain a fixed spaced distance between their axes, said shafts further being subject to pressures during operation tending to change said fixed spaced distance particularly at points intermediate said spaced points, the improvement comprising, a link substantially in the form of a figure-8 within said casing and connecting said shafts intermediate said spaced points, said link adapted to journal said shafts respectively in the loops of said figure-8 and to maintain said fixed spaced distance at said intermediate point without change, said link being supported directly and solely by said shafts, said link further being made of separable parts for ease of assembly.

GEORGE H. GARRAWAY.

REFERENCES CITED

The following references are of record in the file of this patent:

UNITED STATES PATENTS

| Number | Name | Date |
| --- | --- | --- |
| 448,562 | Van Depoele | Mar. 17, 1891 |
| 1,319,776 | Kerr | Oct. 28, 1919 |
| 1,430,894 | Fay | Oct. 3, 1922 |
| 1,450,284 | Goldschmidt | Apr. 3, 1923 |

FOREIGN PATENTS

| Number | Country | Date |
| --- | --- | --- |
| 626,444 | France | May 9, 1927 |
| 672,700 | Germany | Mar. 8, 1939 |